United States Patent [19]

Heeger et al.

[11] Patent Number: 5,427,855
[45] Date of Patent: Jun. 27, 1995

[54] MELT-PROCESSIBLE CONDUCTING POLYMER BLENDS BASED ON FIBRILS OF INTRACTABLE CONDUCTING POLYMERS

[75] Inventors: Alan J. Heeger; Paul Smith, both of Santa Barbara, Calif.

[73] Assignee: Uniax Corporation, Santa Barbara, Calif.

[21] Appl. No.: 99,629

[22] Filed: Jul. 30, 1993

Related U.S. Application Data

[62] Division of Ser. No. 697,316, May 6, 1991, Pat. No. 5,246,627.

[51] Int. Cl.$^6$ ............................................. C08L 79/04
[52] U.S. Cl. ............................ 428/401; 525/417; 525/419; 525/540; 525/212; 525/186
[58] Field of Search .............. 525/419, 540, 417, 186, 525/212

[56] References Cited

U.S. PATENT DOCUMENTS

| | | |
|---|---|---|
| 3,963,498 | 6/1976 | Trevoy . |
| 4,025,463 | 5/1977 | Trevoy . |
| 4,526,706 | 7/1985 | Upson et al. . |
| 4,556,623 | 12/1985 | Tamura et al. . |
| 4,604,427 | 8/1986 | Roberts et al. . |
| 4,759,986 | 7/1988 | Marikar et al. . |
| 4,772,421 | 9/1988 | Ikengaga et al. . |
| 4,781,971 | 11/1988 | Marikar et al. . |
| 4,851,487 | 7/1989 | Yaniger et al. . |
| 4,855,361 | 8/1989 | Yaniger et al. . |
| 4,893,908 | 1/1990 | Wolf et al. . |
| 4,915,985 | 4/1990 | Gould et al. . |
| 4,935,163 | 6/1990 | Cameron . |
| 4,935,164 | 6/1990 | Wessling et al. . |
| 4,963,206 | 10/1990 | Shacklette et al. . |
| 4,983,322 | 1/1991 | Eisenbaumer et al. . |
| 4,983,690 | 1/1991 | Cameron et al. . |
| 5,006,278 | 4/1991 | Eisenbaumer et al. . |
| 5,008,041 | 4/1991 | Cameron et al. . |
| 5,017,420 | 5/1991 | Marikar et al. . |
| 5,069,820 | 12/1991 | Jen et al. . |
| 5,079,096 | 1/1992 | Miyake et al. . |
| 5,093,439 | 3/1992 | Epstein et al. . |
| 5,133,841 | 7/1992 | Higo et al. . |

FOREIGN PATENT DOCUMENTS

| | | |
|---|---|---|
| 0218284 | 4/1987 | European Pat. Off. . |
| 61-195137 | 8/1986 | Japan . |
| 62-012073 | 1/1987 | Japan . |
| 62-047109 | 2/1987 | Japan . |
| 63-70460 | 3/1988 | Japan . |
| 2-240163 | 9/1990 | Japan . |
| WO89/01694 | 2/1989 | WIPO . |
| WO90/10297 | 9/1990 | WIPO . |

OTHER PUBLICATIONS

Andreatta et al., "High performance fibers of conducting polymers" *Mol. Cryst. Liq. Cryst.* (1990) 189:169–182.

Andreatta et al., "Electrically conductive polyblend fibres of polyaniline and poly–(p–phenyline terephthalamide)" *Polymer Comm.* (1990) 31(7):275–278.

Arjavalinghm et al., "Anisotropic conductivity in stretch–oriented polymers measured with coherent microwave transient spectroscopy" *J. Chem. Phys.* (1990) 93(1):6–9 (Abstract).

Cameron et al., "Development and properties of polyaniline–polyimide blends" *3rd International SAMPE Electronics Conference* (Jun. 20–22, 1989) pp. 1163–1174.

Chan et al., "Preparation of polyanilines doped in mixed protonic acids: their characterization by X–ray photoelectron spectroscopy and thermogravimetry" *Synth. Metals* (1989) 31(1):95–108 (Abstract).

(List continued on next page.)

*Primary Examiner*—James J. Seidleck
*Assistant Examiner*—I. Zemel
*Attorney, Agent, or Firm*—Burns, Doane, Swecker & Mathis

[57] ABSTRACT

Microfibrils are formed which include conductive conjugated polymer. These microfibrils are incorporated into polymer admixtures which are thermo-formed into conductive shaped articles.

13 Claims, 5 Drawing Sheets

OTHER PUBLICATIONS

Chan et al., "Chemical preparation and characterization of conductive polyaniline laminate thin films" *Synth. Metals.* (1990) 35(3):333-344 (Abstract).

Chiang et al., "'Polyaniline': protonic acid doping of the emeraldine form to the metallic regime" *Synth. Metals* (1986) 13:193-205.

Focke et al., "Influence of oxidation state, pH, and counterion on the conductivity of polyaniline" *J. Phys. Chem.* (1987) 91:5813-5818.

Green et al., "Aniline-black and allied compounds, Part II" *J. Chem. Soc.* (1912) 101:1117-1123.

Kobayashi et al., "Electrochemical reactions concerned with electrochromism of polyaniline film-coated electrodes" *J. Electroanal. Chem.* (1984) 177:281-291.

LaCroix et al., "Electrooxidation of aromatics to polymer films" *Makromol. Chem. Macromol. Symp.* (1987) 8:17-37.

LaCroix et al., "Polymer blends on electrodes" *1st International SAMPE Electronics Conference* (Jun. 23-25, 1987) pp. 649-656.

Li et al., "Diffusion-oxidative polymerization of transparent and conducting polypyrrole-poly(ethylene terephthalate) composites" *Synth. Metals* (1991) 40:23-28.

MacDiarmid et al., "The polyanilines: potential technology based on new chemistry and new properties" *Paper from the 6th European Physical Society Industrial Workshop Eur. Phys. Soc.* Loftus, Norway, (May 28-31, 1990) (Abstract).

Malhotra et al., "Polyaniline/polymeric acid composite, a novel conducting rubber" *J. Appl. Polymer Sci.* (1990) 40(5-6):10491 $\propto$ 1052.

Monkman et al., "Optical and electronic properties of stretch-oriented solution-case polyaniline films" *Synth. Metals* (1991) 40(1);87-96 (Abstract).

Salaneck et al., "A two-dimensional-surface 'state diagram' for polyaniline" *Synth. Metals* (1986) 13:291-297.

Shacklette et al., "Defect generation and change transport in polyaniline" *Symposium on Electroresponsive Molecular and Polymeric Systems*, Upton, N.Y., (Oct. 25-27, 1989) (Abstract).

Theophilou et al., "Highly conducting polyanilines and polyacetylene/polyaniline composites" *Electric Properties of Conjugated Polymers III Basic Models and Applications*, Proceedings of an International Winter School, (Mar. 11-18, 1989) Kirchberg, Austria, (Abstract).

Kaner et al., "Plastics that conduct electricity" *Scientific American* (1988) 258(2):106-111.

MELT-PROCESSIBLE CONDUCTING POLYMER BLENDS BASED ON FIBRILS OF INTRACTABLE CONDUCTING POLYMERS

This application is a division of application Ser. No. 07/697,316 filed May 6, 1991 now issued on Sep. 21, 1993 as U.S. Pat. No. 5,246,627.

FIELD OF THE INVENTION

This invention relates generally to conducting polymers, and more particularly to melt-processible conducting polymer blends based on fibrils (i.e. fine conducting "needles" with length much greater than diameter) of the conducting polymer component blended with common, commercial insulating polymers so as to obtain shaped articles (for example by injection molding, film extrusion, etc.) which are conductive at low volume fractions of the conducting polymer component and which exhibit excellent mechanical properties.

BACKGROUND OF THE INVENTION

With the discovery of conducting polymers in the late 1970's, the possibility of combining the important electronic and optical properties of semiconductors and metals with the attractive mechanical properties and processing advantages of polymers was proposed. Without exception, however, the initial conducting polymer systems were insoluble, intractable, and non-melting (and thus not processible) with relatively poor mechanical properties.

Success in developing a number of processing routes has opened the way to fabricating conductive polymers into fibers and films etc; i.e. into shapes that can be used for a wide variety of potential applications in the electrical industry. Important problems remain to be solved before such materials can be put into wide spread use. Among these are cost, environmental stability, and melt processibility:

(1) In many cases the starting materials and the synthesis of conjugated polymers are (at least currently) expensive.

(2) Although a number of conjugated polymers have been developed which appear to be stable, long term stability in different environments is still an important problem.

(3) The development of melt processible conducting polymer systems would open a large market for such materials.

One important route toward solution of these problems is to utilize blends and/or composites of conducting polymers with conventional (melt processible) polymers. The dilution of the expensive conjugated polymer in a relatively low cost host (such as, for example polyethylene) immediately yields a major cost benefit. At the same time, such blends effectively encapsulate the conductive polymer fraction within the environmentally stable host, leading to greatly improved long term stability. The achievement of melt-processibility of conductive polymers remains as an important unsolved problem.

There are a large number of melt-processible polymers many of which are commercially available. Today, most melt-processible polymers (such as polyolefins, polyesters, nylons, etc.) with useful mechanical properties are insulators. It would clearly be desirable to render such materials conducting. Previous attempts to render such materials conducting have utilized the general method of filling them with a volume fraction of conducting material such as particles of carbon black, or metal flakes or particles (for example, silver flakes). Addition of such fillers at sufficiently high quantity to yield connected conducting paths (i.e. to be above the percolation threshold; for example, typically about 16% by volume for globular particles) yields moderate electrical conductivities, but at the expense of the mechanical properties. The tensile strength and elongation at break are severely reduced by the fillers. Moreover, because of the sharp onset (known as the "percolation threshold") of the electrical conductivity as a function of the volume fraction of the filler in such conventionally filled polymers, it is difficult to fabricate articles of moderate electrical conductivity (e.g. less than $10^{-4}$ S/cm) for a variety of uses which include the dissipation of static charge. The same disadvantages (e.g. the existence of a sharp threshold for conductivity of the blends at about 16% volume fraction of the conducting polymer, etc.) are relevant to using conducting polymers as filler (see, for example, Conducting Polymer Composites of Soluble Polythiophenes in Polystyrene by S. Hotta, S. D. D. V. Rughooputh and A. J. Heeger, *Syn. Mtls.* 22(1):79 (1987); and references therein).

Alternatively, reticulate doped polymers (J. K. Kreska, J. Ulanski, and M. Kryszewski, Nature, 298:390 (1981)) are composites with a crystalline additive organized into different structures; i.e. isotropic 3- or 2-dimensional dendritic networks (J. Ulanski, A. Tracz and M. Kryszewski, *J. Phys. D: Appl. Phys.* 18:L167 (1985); J. K. Jezka, A. Tracz, J. Ulanski and M. Kryszewski, Pol. Patent No. 138,395 (1985)), quasi-one-dimensional highly oriented crystalline 'strings' (L. Burda, A. Gracz, T. Pakula, J. Ulanski, and M. Kryszewski *J. Phys. D: Appl. Phys.* 16:1737 (1983); J. Ulanski, A. Tracz, E. El Shafee, Go Debrue and R. Deltour, *Synth, Met.* 35:221 (1990)), or chaorically dispersed, separated needles or dendrites [M. Kryszewski, J. K. Jeszka, J. Unanski and A. Tracz, *Pure and Applied Chemistry*, 56:355 (1984)). Miscellaneous conducting reticulate doped polymers have been obtained using various polymer matrices and various conducting charge-transfer complexes (see J. Ulanski, A. Tracz, J. K. Kreszka and M. Kryszewski, *Mol. Cryst. Liq. Cryst.* 118:443 (1985)). However, the reticulate doped polymers are obtained by solution casting of films from a common solution of polymer and the charge transfer salt additive in such conditions that during film solidification, the additive crystallizes in siti (under controlled conditions) in the polymer matrix. Although these reticulate doped polymer composite systems exhibit a low percolation threshold and relatively high conductivity, they are not melt-processible.

Thus, the ability to melt-process conducting articles from polymers and thereby to fabricate such conductive polymers by injection molding, film extrusion etc. into shaped articles with excellent mechanical properties remains seriously limited.

SUMMARY OF THE INVENTION

It is accordingly an object of the present invention to overcome the aforementioned disadvantages of the prior art and, primarily, to provide melt-processible composites/blends of conjugated polymers with common, commercial insulating polymers, said composites/blends being electrically conductive and exhibiting excellent mechanical properties.

It is additionally an object of the present invention to provide melt-processible composites/blends of common, commercial insulating polymers with conjugated polymers, said conjugated polymers being in the form of fibrils or fine conducting "needles" with length much greater than diameter.

It is additionally an object of the present invention to provide methods for the fabrication of fibrils of various conductive polymers with aspect ratios of more than 10 and with a diameter on the micron- or submicron scale.

It is still another object of the invention to provide fibrils of conducting polymers which are intractable, but stable (at least for the relatively short times sufficient to accomplish the melt-processing) at temperatures suitable for melt-processing common, commercial insulating polymers.

It is a further object of this invention to provide melt-processible blends/composites of conducting high-aspect ratio fibrils (such as those made from polyaniline or composites of polyaniline with nylons, aramids, and the like) in melt-processible conjugated polymer hosts, such as for example the poly(3-alkylthiophenes), P3AT's. Since typically such conjugated polymers have finite conductivity without doping, the composite/blend will exhibit electrical conductivity controlled by the volume fraction of the added fibrils at any volume fraction; i.e. there will be essentially no percolation threshold.

Additional objects, advantages and novel features of the invention will be set forth in part in the description which follows, and in part will become apparent to those skilled in the art on examination of the following, or may be learned by practice of the invention. The objects and advantages of the invention may be realized and attained by means of the instrumentalities and combinations particularly pointed out in the appended claims.

We have now found that these objects can be accomplished by a new method for producing shaped electrically conductive articles. This method involves producing conducting polymer-containing fibrils as intermediates and then incorporating the fibrils into a mixture with heat processible polymer and forming the shaped article from the mixture under conditions which substantially retain the fibrils' physical form.

Thus, in one aspect, this invention provides this process for forming conductive shaped articles. In a further aspect, it provides the shaped articles formed using fibrils as intermediates. In another aspect, it provides the fibril intermediates, whether made directly from a conductive polymer or a conductive polymer blend or from a conjugated polymer or conjugated polymer blend which is subsequently rendered more conductive by doping or the like. In yet an additional aspect, this invention provides the methods of forming the conductive polymer fibrils.

DETAILED DESCRIPTION OF THE INVENTION

BRIEF DESCRIPTION OF THE DRAWINGS

In this specification, reference will be made to the Drawings in which.

DESCRIPTION OF PREFERRED EMBODIMENTS

Figure 1:
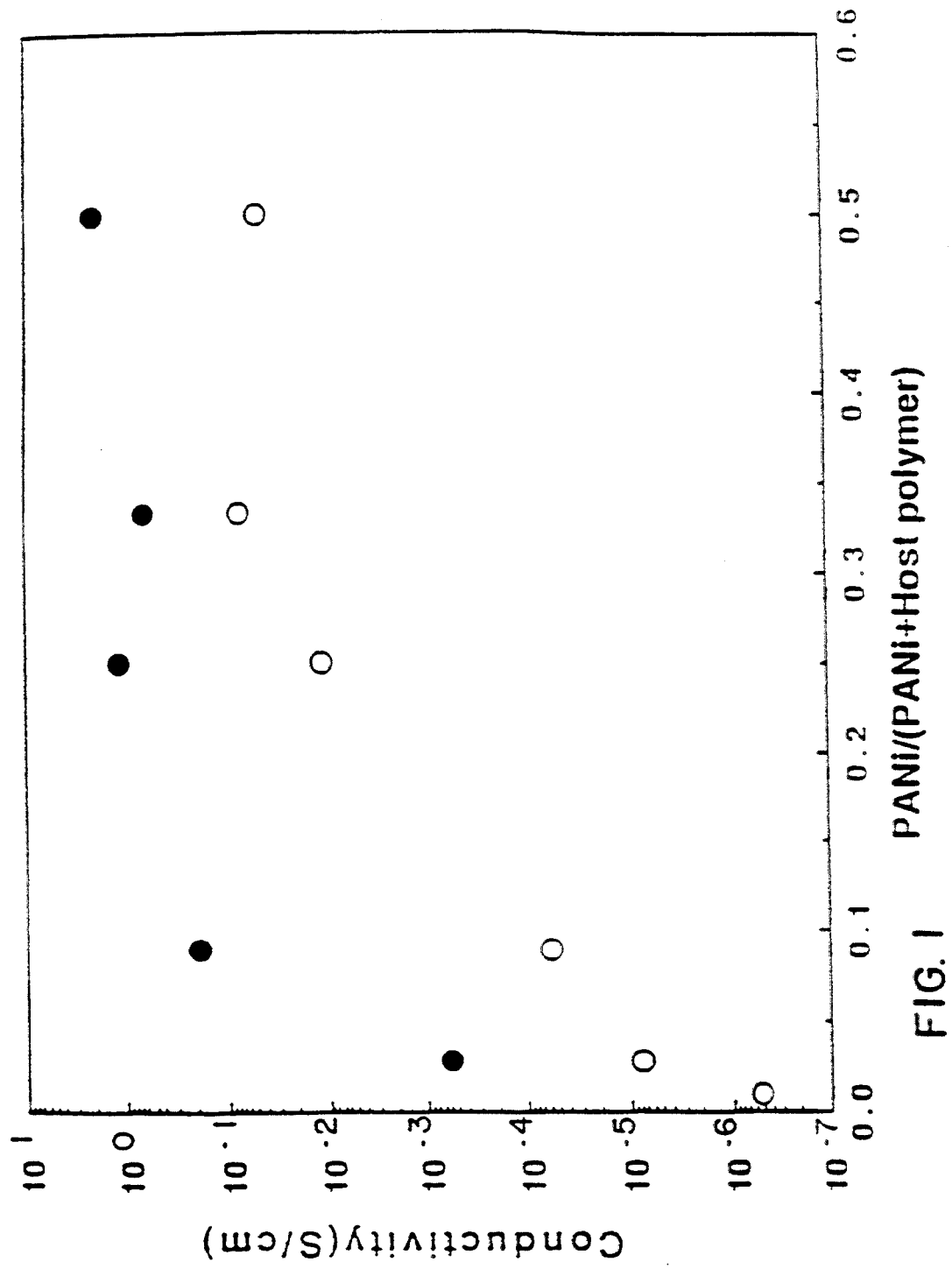
FIG. 1 is a graph showing conductivity data (from Table 2 and Table 3) for microfibril materials as a function of PANi content. In these data the solid points are PANi/nylon-6 microfibers and the open circles are PANI/PPTA microfibers.

This section contains the following subsections:

The Microfibrils

The present invention employs elongate fine microfibrils of conjugated polymer. These materials are fine needles. Typically, they have a length which is greater than their diameter. This ratio of length/diameter is referred to as an "aspect ratio." Commonly, the fibrils have an aspect ratio of at least 5, preferably at least 10, and more preferably at least 50, such as from about 50 to about 250.

These microfibrils preferably have diameters of less than about 200 $\mu$m. (The use of the word "diameter" is chosen to define the average radial cross-dimension. While the fibrils may have a circular cross section, the use of the word "diameter" is not to imply that they must have such a shape. Usually, the finer the fibril diameter, the better, with diameters of less than 50 $\mu$m being preferred and fibrils with diameters of 10 or even 1 $\mu$m or less being more preferred. being preferred and fibrils with diameters of 10 or even 1 $\mu$m or less being more preferred.

The microfibrils contain conjugated polymer. They can be a homopolymer of conjugated polymer or they can be a blend of conjugated polymer and non-conjugated fibril-forming polymer. The fibrils can be conducting as formed or they can be formed in a low conductivity state and rendered more highly conducting by positive or negative doping.

The conjugated polymer can be selected from the conjugated-conductive polymer-forming polymers known in the art. These include poly(aniline) and substituted poly(aniline), such as poly (lower ($C_1$–$C_4$) alkyl anilines). The poly(anilines) can exist in a protonated ($H^+$) state or they can exist as non-protonated bases such as the emeraldine base or as salts such as alakali metal salts. Most commonly, the poly(anilines) are employed as protonated forms of commercially available emeraldine base.

Other representative conjugated polymers include poly(pyrrole) and polymers of derivatives of pyrrole such as poly(alkoxypyrroles) and poly (alkylpyrroles). Poly(para-phenylene sulfide) can be used as well, as can poly(phenylenevinylene) ("PPV") and $C_1$–$C_{10}$ alkoxy derivatives of poly(phenylenevinylene) such as poly (2,5-dimethoxy-p-phenylenevinylene) ("PDMPV"), poly (2-methoxy,5-(2'-ethylhexyloxy)-p-phenylenevinylene) ("MEH-PPV"), and the like; poly(thienylenevinylenes) ("PTV") such as poly(2,5-thienylenevinylene)

and alkoxy and alkyl derivatives thereof; and poly(thiophene) and the "P3AT's" or poly(3-alkyl($C_6$–$C_{16}$) thiophenes) such as poly(3-hexyl, 3-octyl, 3-nonyl, 3-dodecyl or 3-hexadecyl thiophene). These polymers can have degrees of polymerization which result in average molecular weights ranging anywhere from about 1,000 daltons to $10^6$ daltons polymer is not considered critical. Rather, any polymer having conjugated unsaturated bonds in its repeat units, such as the materials just set forth, so as to be able to stabilize conducting dopants and the like and thus give rise to conductive polymers can be used.

The conjugated polymer can be employed as a homopolymer in the microfibrils or it can be present as an admixture with one or more non-conductive, nonconjugated (saturated) carrier polymer. The selection of carrier polymer should be made from polymers which are soluble in solutions of the conjugated polymer and capable of forming fibrils when precipitated from these solutions together with the conjugated polymer. Additionally, they should preferably be materials that are thermally stable at the temperatures subsequently used to heat-process the product into the final shaped articles so as to help retain the fibril configuration during this final shaping.

Additional criteria for the selection of the carrier polymer are as follows: the material should allow for the formation of mechanically coherent fibrils and remain stable in solvents that are capable of dispersing or dissolving the conjugated polymers prior to precipitating.and forming the fibrils. Selection of the carrier polymer is made primarily on the basis of this compatibility with the conjugated polymer as well as with the solvent or solvents employed. For example, blending of polar conjugated polymers generally requires carrier polymers that are capable of codissolving with or absorbing polar reactants. Examples of such materials are poly(vinylalcohol), poly(ethyleneoxide), poly(paraphenylene terephthalate), poly(para-benzamide) and the like. On the other hand, if the blending of the conjugated polymer and the carrier can proceed in a non-polar environment, non-polar carrier structures may be selected such as those containing poly(ethylene), poly(propylene), poly(butylene), poly(vinylchloride) and the like.

Using the selection criteria, the carrier polymer may be selected from polymers such as polyamides, such as nylon 6, nylon 6.6, nylon 4.6, nylon 11 and nylon 12; polyesters such as poly(ethylene terephthalate), poly(butylene terephthalate), poly(paraphenylene terephthalate), polyolefins, such as poly(ethylene) or poly(propylene) or poly(butylene) and copolymers of these olefins with other materials such as propylene, butylene, haptene, hexene and octene; vinyl polymers, such as poly(styrene), poly(vinylchloride), poly(vinylalcohol) and copolymers of styrene with butadiene, acrylonitrile or acrylates.

Turning now to the issue of relative concentrations of the conjugated and carrier polymers, it will be noted that one can use homopolymers of the conjugated material, i.e., 100% conjugated material. It has also been found, however, that one can obtain the desired conjugated polymer properties when the fibrils contain only a minor fraction of conjugated polymer. Thus, the relative proportions of conjugated material to carrier polymer can range down to about 1 part conjugated material to about 250 parts non-conjugated carrier polymer. As will be demonstrated herein in the examples, the electrical conductivity which results is a direct function of the fraction of conductive polymer present. Thus, depending upon the application desired, the proportion of conductive polymer can be varied throughout this range. Usually, the relative proportions of conjugated:carrier polymers range from 10:1 to about 1:30.

The conductivity of the material also depends upon whether or not it contains dopants. The conjugated polymers themselves offer some measurable levels of conductivity without dopants. Dopants increase the conductivity significantly as demonstrated in the examples. These materials which can include electron-accepting and electron-donating substances may be present in concentrations ranging from 0.001% to 50% molar based on the number of conjugated units present in the conjugated polymers. Typical dopants include $FeCl_3$, $PF_6^-$, $SbF_6^-$, etc. and/or dispersable elements such as $I_2$, and acids, such as in $H_2SO_4$, $CH_3HSO_3$, HCl, etc.

Microfibril Preparation

The above-described microfibrils can be prepared by precipitating the conjugated polymer together with any carrier polymer from liquid solution under vigorous agitation. (By the terms "vigorous agitation," "turbulent mixing" or the like is meant a degree of agitation or mixing which gives rise to a Reynold's number in the mixed liquid greater than 3,000 and preferably greater than 3,500.

The microfibrils can be formed by the use of precipitation induced by chilling or by the use of nonsolvents. For example, a solution of the conjugated polymer and optional carrier polymer can be added to a vigorously agitated chilled liquid, for example, aqueous ice slurry, or chilled non-solvent. Alternatively or coincidentally, the solution of conjugated polymer and optional carrier polymer can be added to a non-solvent for these materials. Thus, if the conjugated polymer is soluble in and coming out of a polar solution, such as an aqueous solution, it could be added to a material such as an organic liquid in which the conjugated polymer is not substantially soluble. Irrespective of the exact precipitation method employed, thermal, non-solvent, or the like, it is important that the precipitation be carried out under vigorous agitation.

Thus, in this process, if a highly polar conjugated polymer is used, it may require a very polar solvent such as water or the like as its solvent phase. Less polar materials may employ alcohols, ketones, ethers, lower amides, and the like as solvents with appropriately chosen non-solvents.

Following precipitation, the microfibers can be doped, if desired, such as by adding $FeCl_3$ or iodine or the like. These materials may be added during precipitation or may be added after precipitation. The microfibrils formed by precipitation are recovered by filtration or the like.

Microfibril Admixtures and their Preparation

The microfibrils prepared as described above are employed as components of heat-processible polymer admixtures. These admixtures include the microfibrils just described and a suitable non-conductive insulating polymer. The polymers employed as the non-conductive insulating polymers may be selected generally from the materials described above as carrier polymers. Preferably, however, the materials selected for this use are heat-processible at lower temperatures than the temperatures at which the carrier polymers would melt or degrade. This allows the microfibrils to retain, to a substantial extent, their integrity during the subsequent heat processing. This factor should be kept in mind when selecting a carrier polymer and insulative polymer for the same admixture system. The proportion of insulative polymer and microfibrils may be selected over a broad range depending upon the electrical properties desired in the final shaped articles. For example, the proportions may range from about 99.9 parts microfibrils to 0.1 parts insulative polymer to the converse, i.e., 0.1 parts microfibrils to 99.9 parts of the insulative polymer. In most applications, however, there is generally a more significant fraction of each material. Thus, preferred ratios run from about 99 parts of one material to 1 part of the other to the converse. Even more preferred are materials where there is between 9 parts of fibril to 1 part of insulative polymer to from 1 part of fibrils to 9 parts of insulative polymer.

The preparation of these materials generally proceeds though the physical mixing of the microfibrils with the insulative polymer, the insulative polymer being in a finely divided, i.e., powdered or chopped, form. These materials are thoroughly mixed to give a finely divided material which can then be heat-processed to form the final shaped article.

Forming Shaped Articles

The above-described powdered admixtures of fibrils and insulative polymer are heat-formed into shaped articles. By shaped articles is meant any material having at least one formed dimension such as sheets, rods, extrudates, spun fibers, cast materials, molded materials and the like. In all of these applications, the mixed materials are subjected to heat and/or pressure to an extent adequate to permit the individual particles to fuse together and form a solid shaped article. Typical conditions include temperatures ranging from about 100° C. to about 500° C. and especially about 100° C. to about 350° C. and pressures ranging from 0 psi up to several thousand psi. These conditions should be selected typically as the mildest conditions possible for processing the mixed material into the desired solid objects so as to minimize degradation of the microfibrils. The above-described temperatures are merely representative and those of skill in the processing of polymers into finished articles will be able to select exact conditions which serve their desired purposes.

Representative Applications

The shaped articles which can be produced by the process of this invention have a number of unique and desirable properties. For one, they can have a significant conductivity. This can allow them to work as antistatic fibers, antistatic films, antistatic coatings, and the like. These materials can also be used as electromagnetic interference (EMI) shields. They can be conducting or semi-conducting materials as those terms are used in the art. This can give rise to semiconducting and conducting papers, felts, nonwoven fabrics, woven fabrics, cloths, and the like. The ability to control the electrical properties of the polymer using this process gives rise to the ability also to tailor any of the aforementioned products to particular electrical or electronic properties, if desired. In addition, these materials can be used in electronic applications as components of semiconductors, conductors, and the like.

This invention will be further described by the following Examples. These are provided to illustrate the invention and are not intended to limit its scope which is defined by the appended claims.

EXAMPLES

Example 1

Commercially available nylon 6 (1.945 g) was added to 17.51 g concentrated sulfuric acid (97%). A homogeneous 10%(w/w) nylon 6/sulfuric acid solution was obtained. Polyaniline (1 g of the emeraldine base) was dissolved in 49 g of 97% sulfuric acid to prepare a 2% polyaniline solution. 5.0 g of the 10% nylon 6/sulfuric acid solution and 8.34 g of the 2% polyaniline solution were mixed together and 0.73 g of 97% sulfuric acid was added to keep the total solid content in solution at 3.5%(w/w). The solution was stirred to make it homogeneous. Ice (3 Oz) and water (9Oz) were mixed in a blender and stirred for 2 min to obtain a dilute ice slurry. The PANi/nylon 6/$H_2SO_4$ solution was added slowly under vigorous stirring (1800 rpm in the blender) over a period of 2 min and then stirred (again vigorously) for an additional 2 min. The resulting microfiber material was filtered and treated with 200 ml of 1M aq. HCl solution for 6 hours. The fully-protonated microfibers were filtered again and washed several times subsequently by methanol, acetone and benzene and then transferred into vacuum flask. The flask was cooled by an ice bath for 30 min to allow the benzene to solidify. The flask was then connected to a vacuum line and the solid benzene was sublimated by evacuation ($<10^{-3}$ torr) during 24 hours. Part of resulting sponge like PANi/nylon 6 was pressed into a pellet for conductivity measurements. The typical length to diameter ratio for ⅓(w/w) PANi/nylon 6 fibrils was 50–100 as determined by optical microscopy observation. This value changes with relative ratio of PANi and nylon 6 in initial solution and also with the speed and duration of stirring. Table 1 gives typical data of diameter and length to diameter ratio for microfibers of different composition obtained at same conditions of stirring as described previously.

TABLE 1

Typical Dimensions of the PANi/nylon-6 Microfibers

| PANi/nylon 6 ratio | microfiber diameter ($\mu$m) | aspect ratio (length to diameter) |
|---|---|---|
| 0.00 | 10–20 | 50–100 |
| 0.33 | 10–20 | 50–100 |
| 0.50 | 15–50 | 15–30 |
| 1.00 | flakes with occasional fibers | |

To change the PANi/nylon 6 ratio in the microfiber, the amount of nylon solution (10 g) and total solids content (3.5%) were kept unchanged throughout the experiment; the amount of 2% polyaniline solution and pure sulfuric acid added were varied.

Table 2 gives the conductivity data (obtained from four-probe measurements) for microfibers with different compositions. The data of Table 2 are also shown in graphic form in FIG. 1.

TABLE 2

| Conductivity of PANi/nylon-6 Microfiber Material | |
|---|---|
| PANi/nylon 6 ratio (w/w) | Conductivity (S/cm) |
| 0.030 | $6 \times 10^{-4}$ |

TABLE 2-continued

Conductivity of PANi/nylon-6 Microfiber Material

| PANi/nylon 6 ratio (w/w) | Conductivity (S/cm) |
|---|---|
| 0.100 | 0.19 |
| 0.333 | 1.12 |
| 0.500 | 0.63 |
| 1.000 | 2.10 |

Example 2

The experiment in Example 1 was repeated except that the resulting microfiber material was treated by 1.0 M aq. $H_2SO_4$ instead HCl. The electrical conductivity for the $\frac{1}{3}$(w/w) PANi/nylon 6 microfiber was 0.23 S/cm.

Example 3

The experiment in Example 1 was repeated except that to the PANi/nylon-6/$H_2SO_4$, the equivalent amount (two aniline to one p-sulfonic styrene ring) of poly-p-sulfonic styrene was added, and the microfibers were not treated by 1.0M HCl after microfiber formation. The electrical conductivity for $\frac{1}{3}$(w/w) PANi/nylon-6 fiber was $1.1 \times 10^{-2}$ S/cm. Thermgravimetric analysis data demonstrated that the thermal stability was greatly enhanced by using this polymer protonation agent.

Example 4

Poly(para-phenylene terephthalamide), PPTA, (1.5 g) was dissolved in 98.5 g concentrated sulfuric acid (97%) to prepare a 1.5% PPTA/$H_2SO_4$ solution. PANi/$H_2SO_4$ solution (2%) was prepared as described in Example 1. To prepare $\frac{1}{3}$(w/w) PANi/PPTA/$H_2SO_4$ solution, 12.53 g of 1.5% PPTA/$H_2SO_4$ solution, 3.13 g of 2% PANi/$H_2SO_4$ solution and 4.34 g of 97 $H_2SO_4$ were mixed together and stirred. The total solid content in the solution was 1.25%. The procedure for microfiber formation was essentially the same as described in Example 1. The only difference was that the total solids content was kept constant (1.25%) for all the different PANi/PPTA ratios. From optical microscope observations, the length to diameter ratio of the microfibers was more inhomogeneous for PANi/PPTA (than for the PANi/nylon 6 microfibers) and ranged from microfibers with aspect ratios of about 10–30 to some thin flakes. This is also consistent with the lower conductivity observed for PANi/PPTA microfibers in comparison with that for PANi/nylon 6 microfibers. The conductivity data of pressed pellets of PANi/PPTA are given in Table 3. The data of Table 3 are also plotted in FIG. 1 to enable direct comparison of the conductivity results for PANi/nylon 6 and PANi/PPTA microfibers.

TABLE 3

Electrical conductivity of PANi/PPTA microfibers

| PANi/PPTA ratio (w/w) | Conductivity (S/cm) |
|---|---|
| 0.01 | $5.3 \times 10^{-7}$ |
| 0.03 | $8.0 \times 10^{-6}$ |
| 0.10 | $6.0 \times 10^{-5}$ |
| 0.33 | $1.1 \times 10^{-2}$ |
| 0.50 | $2.4 \times 10^{-2}$ |
| 1.00 | $4.9 \times 10^{-1}$ |

Example 5

The emeraldine base (EB) form of polyaniline (1 g) was dissolved in 100 g N-methyl pyrrolidinone (NMP). The insoluble part was filtered and the soluble part was concentrated (by evaporation) to a 2% solution. Polyvinylchloride (PVC, $M_w$=110,000, Polyscience Inc.), 15 g, was dissolved in 85 g NMP to obtain a 15%(w/w) solution. The EB/NMP solution (0.3 g) was mixed with 2 g of the 15% PVC/NMP solution and stirred overnight to obtain a homogeneous solution. The resulting PANi/PVC/NMP solution was slowly added into 200 ml of methanol in blender while stirring vigorously. Examination of the material under an optical microscope indicated formation of microfibers with diameter of about 1 μm and with a length to diameter ratio of greater than 50. Microfibers were filtered and put into 100 ml of 1M aq. HCl solution for protonation. The resulting fully protonated microfibers were separated by filtration and dried under dynamic vacuum. The typical conductivity data are shown in Table. 4.

TABLE 4

Electrical conductivity of PANI/PVC microfibers

| PANi/PVC (w/w) | Conductivity (S/cm) |
|---|---|
| 0.0033 | $1.3 \times 10^{-7}$ |
| 0.0098 | $1.2 \times 10^{-7}$ |
| 0.0196 | $2.7 \times 10^{-6}$ |

Example 6

Different weighed quantities of the precursor polymer, PPTV, of poly(thienylene vinylene), PTV, were dissolved in 20 g of 1,2,4-trichlorobenzene (TCB) at room temperature. In each case, ultra-high molecular weight polyethylene, UHMW PE, (0.02 g) was added at approximately 150° C. A clear, transparent, light yellow solution was obtained after stirring at 150° C. for 10 to 20 minutes. Subsequently, a small amount of hydrochloric acid (0.035–0.070 g) was introduced into the solution to effect a conversion of PPTV to PTV. The solution was stirred at temperatures between 150°–160° C. for 10 minutes. The resulting solution was semi-transparent with a pink to black color; darker in rough proportion to the amount of PPTV added in the initial step. The solution was precipitated in EtOH (95%) under vigorous stirring in a blender for 5–7 minutes. The precipitate of PTV/PE microfibers was filtered and washed with acetone, and then dried in vacuum at room temperature. The diameter of the microfibers was about 3 μm, the length to diameter ratio was around 12. The microfibers could be pressed into a thin sheet; the resulting sheet was flexible with a color which ranged from pink to black; again, the color was darker in rough proportion to the amount of PPTV added in the initial step. Thinner films of the PTV/PE microfiber blend were obtained by hot-pressing the microfiber sheet at 160° C. for 2–3 minutes. Iodine-doping was effected at a pressure of about 1 mm Hg of $I_2$ vapor. $FeCl_3$ doping was achieved by allowing the sample to come to equilibrium in 0.1M solution of nitromethane.

Figure 2:
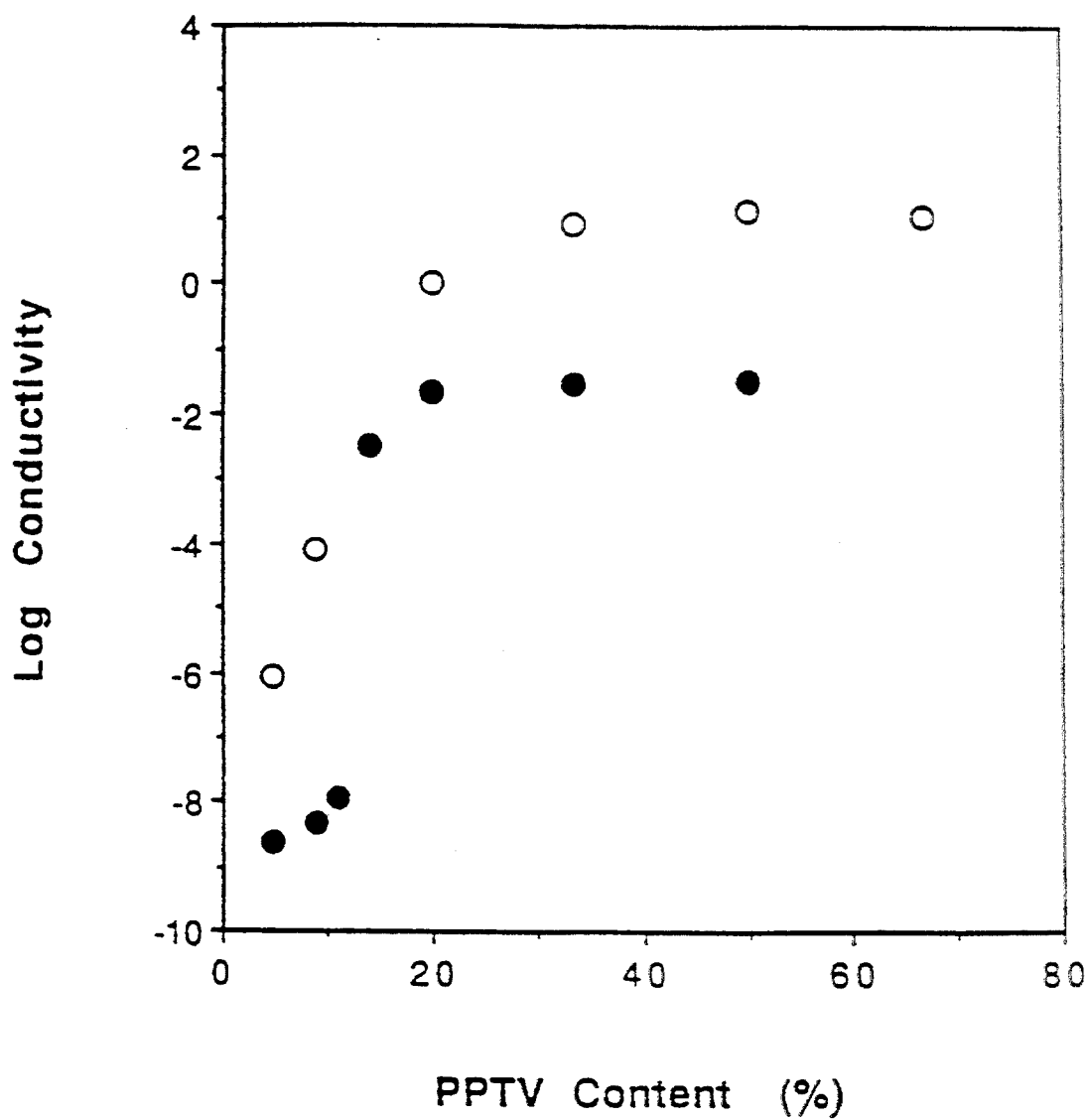
FIG. 2 is a graph showing conductivity data for PTV/PE films fabricated from microfibril materials as a function of PPTV content of the microfibrils (from Table 5). In the figure—solid points are materials doped with iodine vapor and open circles are materials doped with $FeCl_3$.

The electrical conductivity of the PTV/PE films is given in Table 5 and plotted graphically in FIG. 2.

TABLE 5

Electrical Conductivity of PTV/PE Films

| PPTV Content* (%) | Conductivity (S/cm) | |
|---|---|---|
| | $I_2$-doping | $FeCl_3$-doping |
| 4.8 | $8.3 \times 10^{-7}$ | $2.4 \times 10^{-9}$ |
| 9.1 | $8.3 \times 10^{-5}$ | $4.8 \times 10^{-9}$ |
| 11.1 | — | $1.1 \times 10^{-8}$ |
| 14.3 | — | $3.6 \times 10^{-3}$ |

TABLE 5-continued

Electrical Conductivity of PTV/PE Films

| PPTV Content* (%) | Conductivity (S/cm) | |
|---|---|---|
| | $I_2$-doping | $FeCl_3$-doping |
| 20.0 | 1.0 | $2.2 \times 10^{-2}$ |
| 33.3 | 8.4 | $3.0 \times 10^{-2}$ |
| 50.0 | 13.5 | $3.4 \times 10^{-2}$ |
| 66.7 | 11.5 | — |
| 100 | 80 | 47.8 |

*PPTV content = $W_{PPTV}/(W_{PPTV} + W_{PE})$

The mechanical properties of the PTV/PE films as summarized in Table 6

TABLE 6

Mechanical Properties of PTV/PE Films

| PPTV Content (%) | Young's Modulus (GPa) | Tenacity (GPa) | Elongation (%) |
|---|---|---|---|
| 0 | 0.37 | 0.15 | 270 |
| 4.8 | 0.52 | 0.18 | 228 |
| 9.1 | 0.59 | 0.22 | 258 |
| 20.0 | 0.60 | — | 149 |
| 33.3 | 0.63 | — | 166 |
| 50.0 | 0.63 | 0.29 | 266 |

Example 7

Conductive PTV/PE-$FeCl_3$ microfiber material (i.e. conducting without subsequent doping) was obtained by precipitating PTV/PE/TCB solution (prepared as in Example 6) in $FeCl_3$—$CH_3NO_2$ under vigorous stirring in a commercial blender for 5-7 minutes. The precipitate, in the form of PTV/PE-$FeCl_3$ microfibers, was washed with $CH_3NO_2$ and dried in vacuum at room temperature. The diameter of the microfibers was about 3 μm, the typical length to diameter ratio was around 12. After pressing the microfibers into a sheet, the structure was flexible with a color of pink to black depending on PPTV content. At the same PPTV content, the color of PTV/PE-$FeCl_3$ microfibers was darker than that of the corresponding PTV/PE microfibers.

PTV/PE-$FeCl_3$ films were obtained by hot-pressing the microfibers at 160° C. for 2-3 minutes. It was found that the concentration of $FeCl_3$—$CH_3NO_2$ had a major effect on the electrical conductivity of the composite (Table 7).

Figure 3:
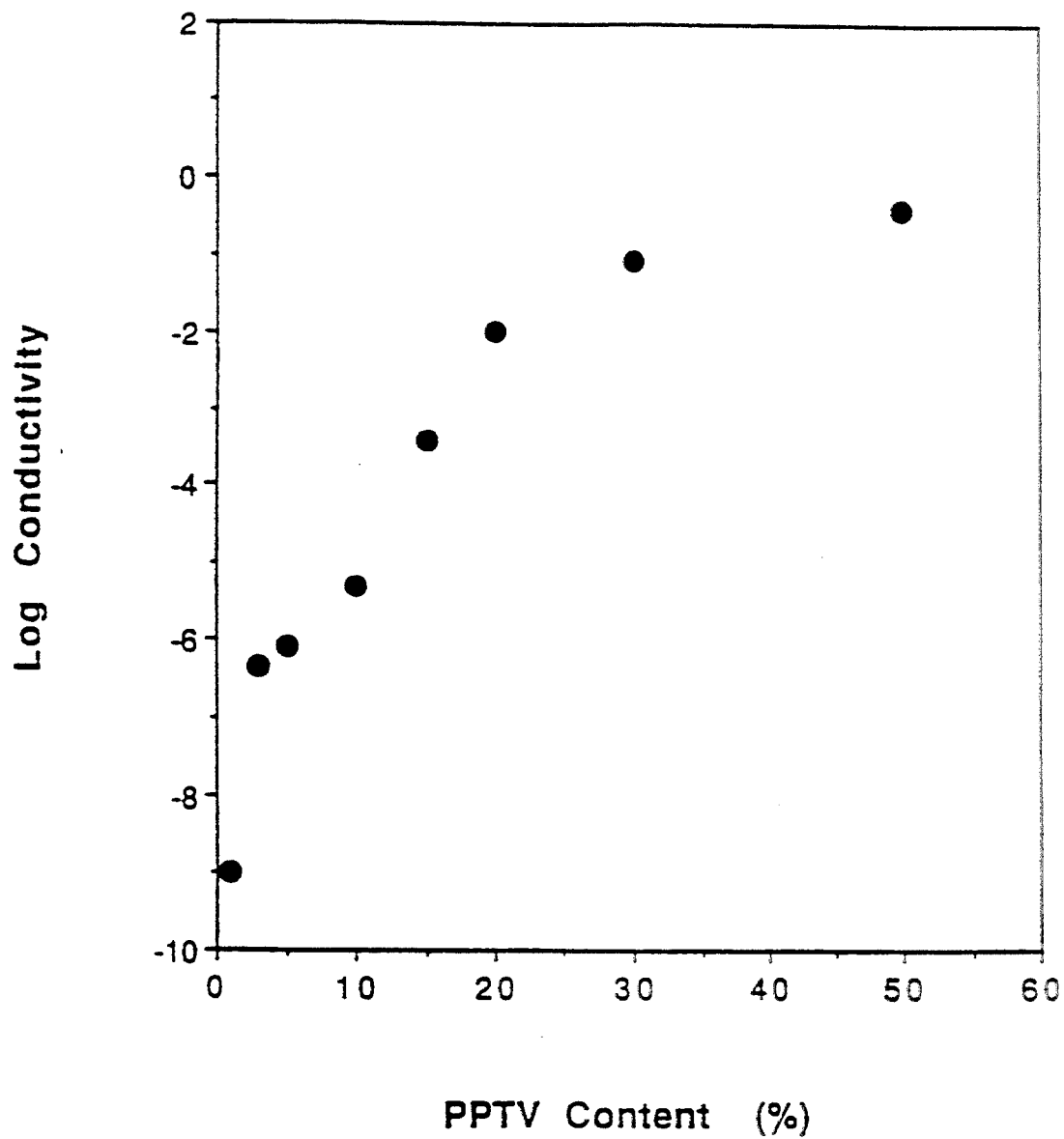
FIG. 3 is a graph showing conductivity data for PTV/PE-$FeCl_3$ films fabricated from microfiber material as a function of PPTV content (from Table 8).

The electrical conductivity of the PTV/PE-$FeCl_3$ films is given in Table 8 as a function of the PPTV content. The data of Table 8 are plotted graphically in FIG. 3. The mechanical properties of the PTV/PE-$FeCl_3$ films are summarized in Table 9.

Surprisingly, the conductivity of the PTV/PE-$FeCl_3$ films was found to be stable upon heating; the conductivity of the films decreased by only one order of magnitude after the material was pressed at 160° C. for 7 minutes.

TABLE 7

The Effect of $FeCl_3$ Concentration on the Conductivity of PTV/PE-$FeCl_3$*

| Concentration of $FeCl_3$ (M) | Conductivity (S/cm) |
|---|---|
| 0.0005 | $5.3 \times 10^{-5}$ |
| 0.002 | $2.6 \times 10^{-2}$ |
| 0.005 | $1.9 \times 10^{-2}$ |
| 0.01 | $1.2 \times 10^{-3}$ |
| 0.02 | $8.0 \times 10^{-5}$ |

*PPTV content was 20%.

TABLE 8

Conductivity of PTV/PE-$FeCl_3$ Films*

| PPTV Content (%) | Conductivity (S/cm) |
|---|---|
| 1 | $1.0 \times 10^{-9}$ |
| 3 | $4.5 \times 10^{-7}$ |
| 5 | $8.4 \times 10^{-7}$ |
| 10 | $4.9 \times 10^{-6}$ |
| 15 | $3.7 \times 10^{-4}$ |
| 20 | $1.0 \times 10^{-2}$ |
| 30 | $8.2 \times 10^{-2}$ |
| 50 | $3.8 \times 10^{-1}$ |

*The PTV/PE-$FeCl_3$ microfibers were prepared in 0.002 M $FeCl_3$—$CH_3NO_2$ solution.

TABLE 9

Mechanical Properties of PTV/PE-$FeCl_3$ Films

| PPTV Content (%) | Young's Modulus (GPa) | Tenacity (GPa) | Elongation (%) |
|---|---|---|---|
| 1 | 0.55 | 0.36 | 124 |
| 5 | 0.48 | 0.27 | 163 |
| 10 | 0.35 | 0.23 | 151 |
| 50 | 0.62 | 0.12 | 136 |

Example 8

The PTV/PE-$FeCl_3$ fibrils (prepared by doping PTV/PE in 0.1M $FeCl_3$—$CH_3NO_2$ solution) can be blended with PE. The blends were prepared by mixing and hot-pressing a weighed amount of the compressed microfiber films or of the microfibers with PE film at 160° C. four times, each 2 minutes. The films thus obtained were 50-130 mm thick and were strong, flexible and opaque with a purple or black color, depending on the PTV content.

The electrical conductivity of the PTV/PE-$FeCl_3$ fibrils mixed and blended with PE are summarized in Table 10. Note that since the PTV content in the microfibrils was only 20%, there was finite conductivity (for example, $5 \times 10^{-5}$ S/cm at a concentration of less than 5 wt % PTV.

TABLE 10

Conductivity of Blends of PTV/PE-$FeCl_3$ fibrils* with PE

| PTV/PE-$FeCl_3$ Content (%) | Conductivity (S/cm) |
|---|---|
| 10.1 | $2.3 \times 10^{-10}$ |
| 20.0 | $5.0 \times 10^{-9}$ |
| 24.2 | $5.3 \times 10^{-5}$ |
| 40.1 | $3.0 \times 10^{-4}$ |
| 60.0 | $1.4 \times 10^{-3}$ |
| 77.5 | $1.2 \times 10^{-2}$ |
| 100.0 | $6.6 \times 10^{-2}$ |

*PPTV content was 20%.

Figure 4:
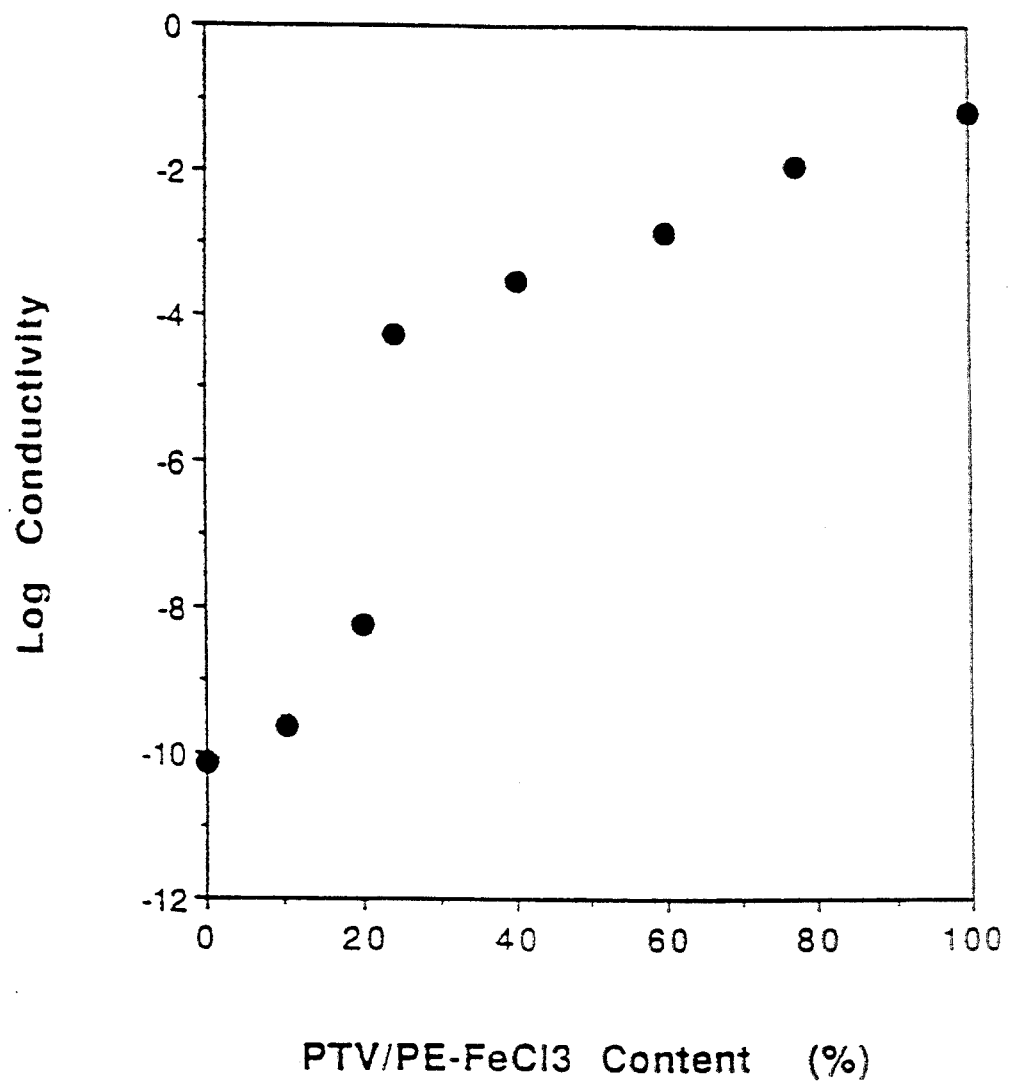
FIG. 4 is a graph showing conductivity data for blends of PTV/PE-$FeCl_3$ film fabricated from microfiber material with PE as a function of PPTV content (from Table 10).

The data of Table 10 are plotted graphically in FIG. 4

Example 9

The PTV/PE-$FeCl_3$ microfibers prepared directly as in Example 7 can be blended with PE. After mixing and hot-pressing a weighed amount of the microfiber material with PE film at 160° C., the resulting electrical conductivities were as listed in Table 11.

TABLE 11

Conductivity of Blends of PTV/PE-$FeCl_3$* Microfibers with PE

| PTV/PE-$FeCl_3$ Content | Conductivity (S/cm) |
|---|---|
| 10.5 | $3.0 \times 10^{-12}$ |
| 20.8 | $6.0 \times 10^{-10}$ |
| 26.7 | $9.1 \times 10^{-6}$ |

TABLE 11-continued

| Conductivity of Blends of PTV/PE-FeCl$_3$* Microfibers with PE | |
|---|---|
| PTV/PE-FeCl$_3$ Content | Conductivity (S/cm) |
| 40.5 | $1.1 \times 10^{-4}$ |
| 60.8 | $2.2 \times 10^{-4}$ |
| 79.7 | $1.9 \times 10^{-3}$ |
| 100 | $3.8 \times 10^{-2}$ |

*PPTV content was 20%.

Figure 5:
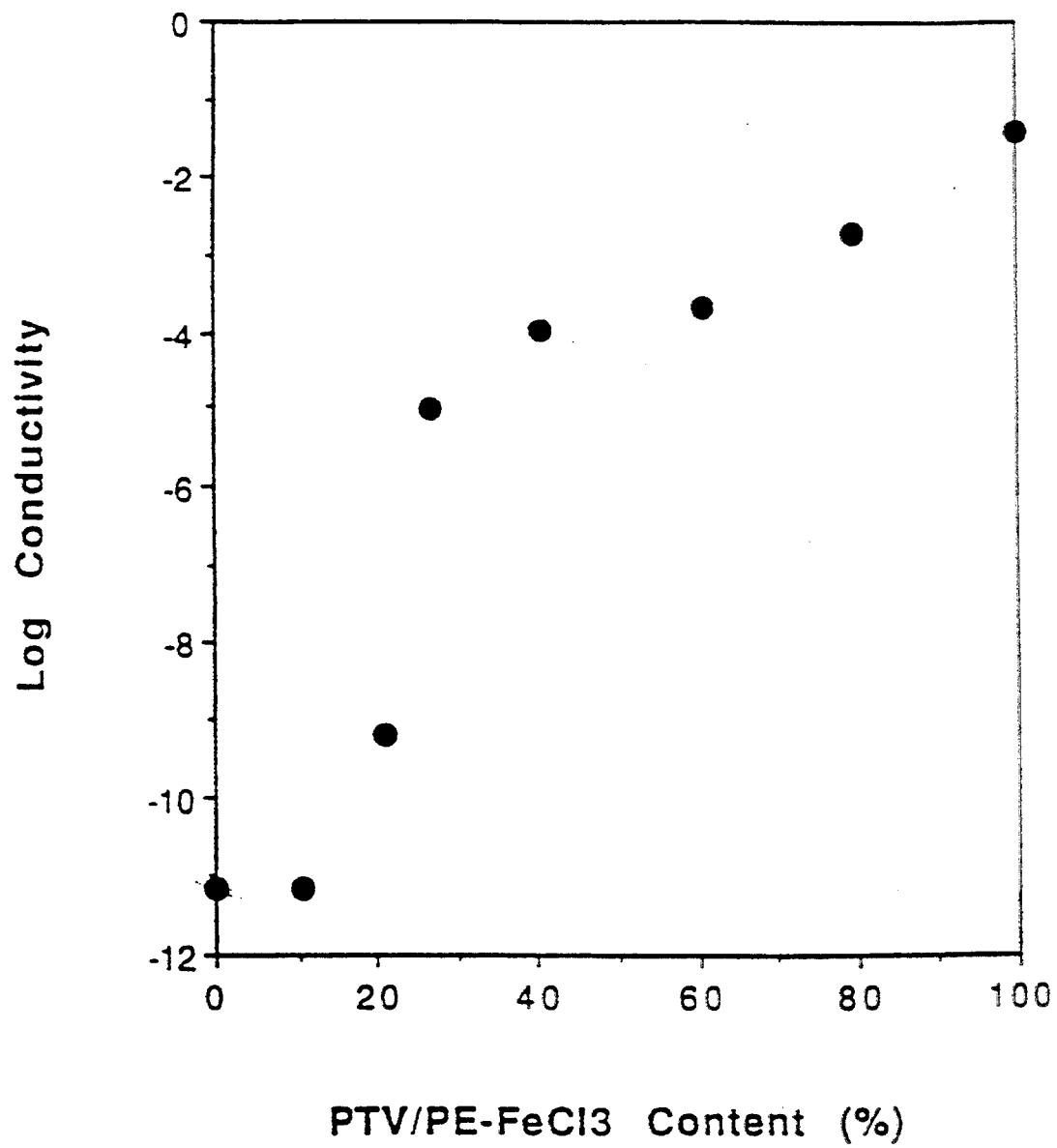
FIG. 5 is a graph showing conductivity data for blends of PTV/PE-$FeCl_3$ microfibers with PE as a function of PPTV content (from Table 11).

These data are plotted graphically in FIG. 5. Note that since the PTV content in the microfibrils was only 20%, there was finite conductivity (for example, $9.1 \times 10^{-6}$ S/cm at a concentration of only about 5 wt % PTV).

The mechanical properties of the blends of PTV/PE-FeCl$_3$ microfibers with PE are summarized in Table 12.

TABLE 12

| Mechanical Properties of Blends of PTV/PE-FeCl$_3$ Microfibers with PE | | | |
|---|---|---|---|
| PTV/PE-FeCl$_3$* Content (%) | Young's Modulus (GPa) | Tenacity (GPa) | Elongation (%) |
| 9.9 | 0.35 | 0.10 | 150 |
| 21.1 | 0.38 | 0.10 | 122 |
| 25.0 | 0.30 | 0.16 | 93 |
| 39.8 | 0.54 | 0.11 | 118 |
| 59.4 | 0.32 | 0.10 | 130 |
| 81.6 | 0.33 | 0.34 | 246 |

*PPTV content was 25%.

We claim:

1. Elongate fine microfibrils formed of polymer comprising conjugated polymer having an aspect ratio of at least about 5 and a diameter of less than 200 mum.

2. Elongate fine microfibrils consisting essentially of conjugated polymer having an aspect ratio of at least about 5 and a diameter of less than 200 mum.

3. Elongate fine microfibrils formed of a blend of conjugated polymer with saturated fibril-forming polymer having an aspect ratio of at least about 5 and a diameter of less than 200 mum.

4. The microfibrils of claim 1 wherein the conjugated polymer is poly(aniline) or a substituted polyaniline or co-polymers or salts thereof.

5. The microfibrils of claim 1 wherein the conjugated polymer is poly(phenylenevinylene), substituted poly (phenylenevinylene) or co-polymers thereof.

6. The microfibrils of claim 1 wherein the conjugated polymer is poly(thienylenevinylene), substituted poly (thienylenevinylene) or co-polymers thereof.

7. The microfibrils of claim 1 wherein the conjugated polymer is poly(pyrrole), substituted poly(pyrrole) or co-polymers thereof.

8. The microfibrils of claim 1 wherein the conjugated polymer is poly(thiophene), substituted poly(thiophene) or co-polymers thereof.

9. The microfibrils of claim 9 wherein the conjugated polymer is poly (3-alkyl thiophene).

10. The microfibrils of claim 1 being electrically conductive wherein the conjugated polymer is conducting conjugated polymer.

11. The microfibrils of claim 2 being electrically conductive wherein the conjugated polymer is conducting conjugated polymer.

12. The microfibrils of claim 3 being electrically conductive wherein the conjugated polymer is conducting conjugated polymer.

13. The microfibrils of claim 12 wherein the saturated polymer is selected from the group comprising polyamides including nylon 6, nylon 6.6, nylon 4.6, nylon 11, and nylon 12; polyesters including poly(ethylene terephthalate), and poly(butyleneterephthalate); polyolefins including poly(ethylene), and copolymers of ethylene with propylene, butylene, heptene, hexene, and octene; isotactic poly(propylene) and copolymers with ethylene vinyl polymers including polystyrene, poly(vinylchloride), poly(vinylalcohol), and copolymers of styrene; with butadiene, acrylonitrile, and acrylates.

* * * * *